(12) United States Patent
Awazu (10) Patent No.: US 7,769,288 B2
(45) Date of Patent: Aug. 3, 2010

(54) IMAGE TAKING APPARATUS AND METHOD OF LIGHT EMISSION

(75) Inventor: Kouhei Awazu, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 378 days.

(21) Appl. No.: 11/859,244

(22) Filed: Sep. 21, 2007

(65) Prior Publication Data

US 2008/0075448 A1 Mar. 27, 2008

(30) Foreign Application Priority Data

Sep. 22, 2006 (JP) .............................. 2006-257148

(51) Int. Cl.
*G03B 15/03* (2006.01)
*G03B 7/26* (2006.01)

(52) U.S. Cl. ...................................... 396/155; 396/205

(58) Field of Classification Search ................. 396/155, 396/157, 164, 182, 205; 348/370
See application file for complete search history.

(56) References Cited

U.S. PATENT DOCUMENTS 7,509,043 B2* 3/2009 Matsui et al. ............... 396/164
2005/0174475 A1* 8/2005 Yoshida ...................... 348/370

FOREIGN PATENT DOCUMENTS

JP 2005-338280 A 12/2005

* cited by examiner

*Primary Examiner*—Rodney E Fuller
(74) *Attorney, Agent, or Firm*—Sughrue Mion, PLLC (57) ABSTRACT

A relatively small current is supplied to an LED arranged on a center portion, of two or more LED's, and a relatively large current is supplied to an LED arranged on a peripheral portion, of the two or more LED's. This feature makes it possible to substantially equalize rise of temperature.

8 Claims, 12 Drawing Sheets

IMAGE TAKING APPARATUS AND METHOD OF LIGHT EMISSION

BACKGROUND OF THE INVENTION

1. Field of the Invention

The present invention relates to an image taking apparatus that forms an image of a subject on an imaging device to create image data representative of the subject, and a method of light emission of a light-emitting section of the image taking apparatus.

2. Description of the Related Art

Recently, in an image taking apparatus, there is movement of using LED as a luminescence source of image taking auxiliary light instead of a conventional luminescence tube (for instance, refer to Japanese Patent Application Laid Open Gazette TokuKai 2005-338280). According to the technology of Japanese Patent Application Laid Open Gazette TokuKai 2005-338280, two or more LED's are arranged on a two-dimensional basis, and the image taking auxiliary light is projected to a subject with the irradiation angle according to the focal length by changing the luminescence amount of LED in proportion to the focal length. As described in this Japanese Patent document, the two-dimensional arrangement of two or more LED's makes it possible to emit the image taking auxiliary light, and in addition, makes it possible to utilize luminescence of LED's as AF auxiliary light by luminescence of at least one of a large number of LED's during adjustment of the focal length.

By the way, when LED's, which are arranged on a two-dimensional basis, are driven to continue light emission, LED's in the center part is not radiated well, and the temperature of LED's in the center part might rise as compared with the peripheral LED's. Tiredness is accumulated in LED in the center part by the rise in heat when it keeps driving two or more LED's though the temperature of LED in the center part rises, and there is a possibility that LED in the center part is finally damaged earlier than LED in the surrounding.

SUMMARY OF THE INVENTION

In view of the foregoing, it is an object of the present invention to provide an image taking apparatus capable of contributing to equalization of the life of individual one of two or more LED's arranged on a two-dimensional basis, of the light-emitting section, and a method of light emission of the light-emitting section of the image taking apparatus.

To achieve the above-mentioned objects, the present invention provides a first image taking apparatus that forms an image of a subject on an imaging device to create image data representative of the subject, the image taking apparatus including:

a light-emitting section in which two or more LED's are arranged on a two-dimensional basis, the light-emitting section emitting light to the subject; and a driving section that supplies current to the two or more LED's for luminescence, wherein the driving section causes the two or more LED's to perform light emission in such a way that a relatively small current is supplied to an LED arranged on a center portion, of the two or more LED's, and a relatively large current is supplied to an LED arranged on a peripheral portion, of the two or more LED's.

According to the first image taking apparatus of the present invention as mentioned above, the driving section causes the two or more LED's to perform light emission in such a way that a relatively small current is supplied to LED's arranged on a center portion, of the two or more LED's, and a relatively large current is supplied to LED's arranged on a peripheral portion, of the two or more LED's.

This feature makes it possible to suppress of rise of a temperature of LED's arranged on the center portion, of the two or more LED's, since a relatively small current is supplied to LED's arranged on the center portion as compared with LED's arranged on a peripheral portion, of the two or more LED's. Thus, it becomes difficult for tiredness to be accumulated in LED's in the central portion.

As a result, the longevity of LED's in the center part is postponed, the difference of the longevity between LED's in the peripheral portion is corrected, and the equalization of longevity is attempted.

In the image taking apparatus according to the present invention as mentioned above, it is acceptable that the driving section causes the two or more LED's to perform light emission in such a way that a relatively small duty ratio of current is supplied to an LED arranged on a center portion, of the two or more LED's, so that a relatively small current on a time-means basis is supplied, and a relatively large duty ratio of current is supplied to an LED arranged on a peripheral portion, of the two or more LED's, so that a relatively large current on a time-means basis is supplied.

In the image taking apparatus according to the present invention as mentioned above, it is acceptable that the driving section causes the two or more LED's to perform light emission in such a way that a relatively short time width of pulse current is supplied to an LED arranged on a center portion, of the two or more LED's, so that a relatively small current on a time-means basis is supplied, and a relatively long time width of pulse current is supplied to an LED arranged on a peripheral portion, of the two or more LED's, so that a relatively large current on a time-means basis is supplied, and in addition pulse currents are alternatively supplied to an LED arranged on a center portion and an LED arranged on a peripheral portion, of the two or more LED's.

To achieve the above-mentioned objects, the present invention provides a second image taking apparatus that forms an image of a subject on an imaging device to create image data representative of the subject, the image taking apparatus including:

a light-emitting section in which two or more LED's are arranged on a two-dimensional basis, the light-emitting section emitting light to the subject; and a driving section that supplies current to the two or more LED's for luminescence, wherein the driving section supplies a relatively smaller current to an LED in which the temperature rises more intensively than the rest of the two or more LED's, in accordance with the temperature rise of the two or more LED's.

According to the second image taking apparatus of the present invention as mentioned above, a small current is supplied to the two or more LED's as relatively as LED that the rise in heat is intense. Thus, it is possible to suppress rise of a temperature. For example, a temperature sensor is used to detect LED's which are intense in the rise of the temperature and a relatively small current conducts through the LED's in accordance with the temperature of the detected LED's, or reversely a relatively large current conducts through LED's which are little in the rise of the temperature. This feature makes it possible to suppress the rise of the temperature of LED's which are intense in the rise of the temperature.

To achieve the above-mentioned objects, the present invention provides a third image taking apparatus that forms an image of a subject on an imaging device to create image data representative of the subject, the image taking apparatus including:

a light-emitting section in which two or more LED's are arranged on a two-dimensional basis, the light-emitting section emitting light to the subject; and a driving section that supplies current to the two or more LED's for luminescence, wherein the light-emitting section emits an image taking auxiliary light to a subject at the time of image taking, and emits AF auxiliary light to the subject at the time of focus control, and wherein the light-emitting section emits the image taking auxiliary light in such a way that a current is supplied to the two or more LED's for luminescence, and emits the AF auxiliary light in such a way that a main amount of current is supplied to at least one LED arranged on a peripheral portion, of the two or more LED's, so that the at least one LED arranged on the peripheral portion emits light with a main light quantity.

When the AF auxiliary light is emitted, there is no need of luminescence of all LED's. Accordingly, a main amount of current is supplied to LED's arranged on a peripheral portion, of the two or more LED's, so that the LED's arranged on the peripheral portion emit light with a main light quantity. This feature makes it possible to enhance frequency in use of LED's on the periphery. Thus, it is possible to equalize the tiredness of LED's arranged on a central portion and the tiredness of LED's arranged on a peripheral portion.

In the image taking apparatus according to the present invention as mentioned above, it is acceptable that all the two or more LED's emit light to the whole area in angle of field.

This feature makes it possible to obtain a necessary light quantity as the image taking auxiliary light in its entirety, even if a relatively small current conducts through LED's arranged on a central portion.

In the image taking apparatus according to the present invention as mentioned above, it is acceptable that LED's arranged on a center portion, of the two or more LED's, emit light to the whole area in angle of field, and the LED's arranged on a peripheral portion, of the two or more LED's, emit light to a central portion in angle of field.

This feature makes it possible to increase the light quantity on the central portion so as to concentrate and project the image taking auxiliary light to the subject. Moreover, when the AF auxiliary light is emitted, the LED's arranged on a peripheral portion emit the light to the LED's arranged on a peripheral portion. Thus, it is possible to efficiently project AF auxiliary light to the subject which usually exists at the central portion.

To achieve the above-mentioned objects, the present invention provides a fourth image taking apparatus that forms an image of a subject on an imaging device to create image data representative of the subject, the image taking apparatus including:

a light-emitting section in which two or more LED's are arranged on a two-dimensional basis, the light-emitting section emitting light to the subject; and a driving section that supplies current to the two or more LED's for luminescence, wherein the light-emitting section comprises two or more sorts of LED's which emit mutually different light, in which an LED that is relatively high in efficiency of light emission is arranged at a central portion, and an LED that is relatively low in efficiency of light emission is arranged at a peripheral portion.

According to the fourth image taking apparatus of the present invention as mentioned above, LED's that are relatively high in efficiency of light emission are arranged at a central portion. Accordingly, even if the driving section supplies a relatively small current to the LED's arranged at a central portion, it is possible for the LED's arranged at the central portion to perform a light emission with a predetermined light quantity. At that time, since a relatively small current is supplied to the LED's arranged at the central portion, the rise of the temperature of LED's arranged at a central portion is small. On the other hand, LED's that are relatively low in efficiency of light emission are arranged at a peripheral portion. Accordingly, the driving section should supply a relatively large current to the LED's arranged at the peripheral portion to perform a light emission with a predetermined light quantity. However, it is possible to expect a large effect of radiation of heat on LED's arranged at the peripheral portion. Thus, it is possible to obtain a stable rise of the temperature in its entirety.

In the image taking apparatus according to the present invention as mentioned above, it is acceptable that the two or more sorts of LED's are three sorts of LED's emitting red light, blue light, and green light, and wherein the LED emitting blue light is mainly arranged at the central portion, the LED emitting red light is mainly arranged at the peripheral portion, and the LED emitting green light is arranged between the central portion and the peripheral portion.

In the image taking apparatus according to the present invention as mentioned above, it is acceptable that the two or more sorts of LED's are three sorts of LED's emitting red light, blue light, and green light, and wherein the LED emitting red light, the LED emitting blue light, and the LED emitting green light are arranged on an intermixing basis in such a way that a lot of the LED's emitting red light is located at the peripheral portion, and the LED emitting blue light is located at the central portion.

To achieve the above-mentioned objects, the present invention provides a first method of light emission of a light-emitting section in which two or more LED's are arranged on a two-dimensional basis, the light-emitting section emitting light to the subject, the light-emitting section being provided in an image taking apparatus that forms an image of a subject on an imaging device to create image data representative of the subject, wherein a relatively small current is supplied to an LED arranged on a center portion, of the two or more LED's, and a relatively large current is supplied to an LED arranged on a peripheral portion, of the two or more LED's, so that the two or more LED's perform light emission.

To achieve the above-mentioned objects, the present invention provides a second method of light emission of a light-emitting section in which two or more LED's are arranged on a two-dimensional basis, the light-emitting section emitting light to the subject, the light-emitting section being provided in an image taking apparatus that forms an image of a subject on an imaging device to create image data representative of the subject, wherein the light-emitting section emits an image taking auxiliary light to a subject at the time of image taking, and emits AF auxiliary light to the subject at the time of focus control, and wherein the light-emitting section emits the image taking auxiliary light in such a way that a current is supplied to the two or more LED's for luminescence, and emits the AF auxiliary light in such a way that a main amount of current is supplied to at least one LED arranged on a peripheral portion, of the two or more LED's, so that the at least one LED arranged on the peripheral portion emits light with a main light quantity.

As described above, an image taking apparatus capable of contributing to equalization of the life of individual one of two or more LED's arranged on a two-dimensional basis, of the light-emitting section, and a method of light emission of the light-emitting section of the image taking apparatus are obtained.

DETAILED DESCRIPTION OF PREFERRED EMBODIMENTS

Embodiments of the present invention will be described with reference to the accompanying drawings.

Figure 1:
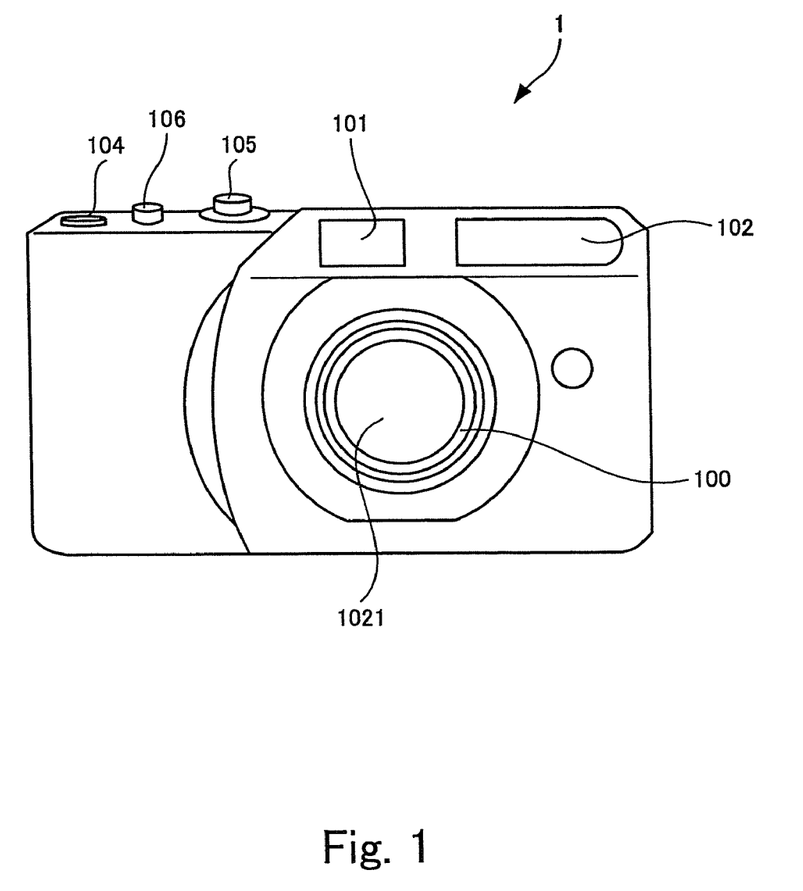
FIG. 1 is a perspective view of a digital camera 1 of an embodiment of the present invention.

FIG. 1 is a perspective view of a digital camera of an embodiment of the present invention, looking from the front wherein a lens is mounted.

A digital camera 1 has a lens barrel 100 at the center. The lens barrel 100 incorporates therein an image taking lens 1021. Moreover, a viewfinder 101 is prepared for above the lens barrel 100, and a luminescence window 102 is prepared for next to the viewfinder 101. When a system control circuit (which will be described later) decides necessity for projection of an image taking auxiliary light, the image taking auxiliary light is projected through the luminescence window 102 to the subject. While details will be described later, according to the present embodiment, there is provided an arrangement of two or more LED's in which luminescence means are arranged on a two-dimensional basis, and the image taking auxiliary light is projected to a subject from the LED's.

On the top of the camera body, there are provided a release button 104, a mode dial 105, and a single-page/multi-page change over switch 106.

Figure 2:
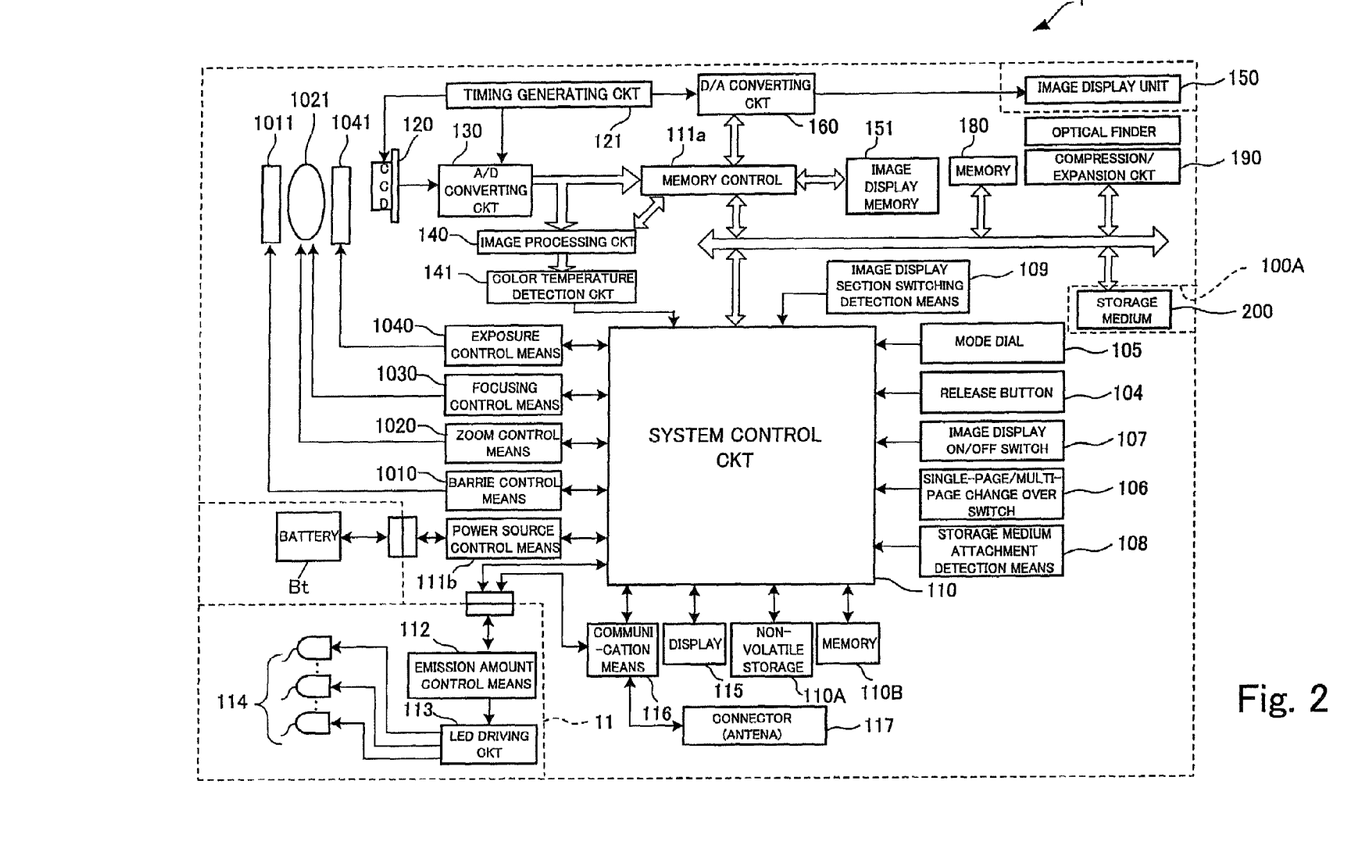
FIG. 2 is a functional block diagram of the digital camera 1 of FIG. 1.

FIG. 2 is a functional block diagram of the digital camera 1 of FIG. 1.

There will be explained the internal structure of the digital camera 1 of FIG. 1 in conjunction with FIG. 2.

According to the digital camera 1 of the present embodiment, a system control circuit 110 controls all processing for the digital camera 1. Connected to an input portion of the system control circuit 110 are handlers such as the release button 104, the mode dial 105, and the single-page/multi-page change over switch 106, which are shown in FIG. 1. When anyone of those handlers is operated, an operation signal is supplied to the system control circuit 110, so that processing according to the operation is started.

The digital camera 1 according to the present embodiment is so arranged that a storage medium 200 such as a memory card is detachably mounted on a medium mounting chamber 100A so that image data representative of a photographic image is recorded on the memory card 200 mounted on the medium mounting chamber 100A. Thus, the digital camera 1 has storage medium attachment detection means 108 for detecting as to whether the memory card as the storage medium is mounted on the medium mounting chamber 100A, while this is not illustrated in FIG. 1. Moreover, the digital camera 1 has an image display ON/OFF switch 107 provided on the back side, and image display section switching detection means 109 for detecting open and shut of a protective door for protecting a surface of a display panel provided on the back side of the digital camera 1, while this is not illustrated in FIG. 1. Signals generated from the storage medium attachment detection means 108, image display ON/OFF switch 107 and image display section switching detection means 109 are also supplied to the system control circuit 110 to perform suitable processing. The system control circuit 110 instructs zoom control means 1020 in accordance with operation of a zoom switch (not illustrated) to move a zoom lens of image taking lens 1021, and instructs focusing control means 1030 in accordance with a focusing result to move a focus lens of the image taking lens 1021.

The system control circuit 110 performs the TTL photometry as well as the TTL focusing in image data generated in a CCD solid state imaging device 120. The system control circuit 110 instructs exposure control means 1040 to adjust the aperture diameter of an aperture 1041 in accordance with the photometry result of the TTL photometry. At the time of the photography, the system control circuit 110 instructs emission amount control means 112 of emission means 11 in accordance with the photometry result of the TTL photometry to cause a LED driving circuit 113 to drive two or more LED's 114, so that two or more LED's 114 project the image taking auxiliary light to the subject.

According to the present embodiment, in order to achieve the objects of the present invention, a relatively small current is supplied to LED's of the center portion of two or more LED's 114, while a relatively large current is supplied to LED's of the periphery, so that it is prevented that LED's in the center portion become tired by the rise in heat by the luminescence of the image taking auxiliary light, and finally be destroyed.

Next, there will be explained the outline of the image taking processing of the digital camera 1 having luminescence means provided with the above-mentioned plural LED 114 as a luminescence source.

According to the present embodiment, when a power source switch of the digital camera 1 turns on, the system control circuit 110 controls the operation of the digital camera 1 in its entirety in accordance with the procedure of the whole processing program stored in a non-volatile storage 110A to start the image taking processing. According to this example, in order to save dissipation power of the battery, a battery Bt only supplies the power through power source control means 111b to individual blocks, when a power switch (not illustrated) of the digital camera 1 turns on and the system control circuit 110, to which the power is always supplied from the battery Bt, detects turn on of the power switch.

First of all, there will be briefly explained structure and operation of the processing section related to the image taking processing of the digital camera 1 taking an operational condition that the power is supplied to individual sections, in conjunction with FIG. 2.

As shown in FIG. 2, the lens barrel 100 shown in FIG. 1 incorporates therein the image taking lens 1021 such as the focus lens and the zoom lens, and the aperture 1041 for the light quantity adjustment. According to the present embodiment, the lens barrel 100 further incorporates therein a lens barrier 1011 for protecting a lens. When the power switch turns on, the lens barrier 1011 is released so that the image taking lens 1021 is exposed to the surface as shown in FIG. 1.

In the event that the mode dial 105 is switched to the image taking side when the power switch turns on, the subject image, which is formed on the CCD solid state imaging device 120 through the image taking lens 1021 exposed to the surface, is thinned out based on the timing signal from a timing generation circuit 121 at prescribed intervals (For instance, each 33 ms) and output. A/D conversion circuit 130 converts the thus output image signal from an analog image signal to a digital image signal. The thus converted digital image signal is led to an image processing circuit 140 under the control of a memory control section 111a. The image processing circuit 140 separates image signals of RGB into R, G, and B signals. The thus separated R, G, and B signals are led to the system control circuit 110 under the control of the memory control section 111a. The system control circuit 110 performs a white balance regulation, a γ correction, and a conversion into YC signals, for the R, G, and B signals, and then the YC signals are led to an image display memory 151 under the control of the memory control section 111a so as to be stored in the image display memory 151 in form of an image signal representative of a through image. A frame of image signals, which is stored in the image display memory 151, is read out by the memory control section 111a, and is led to a D/A conversion circuit 160 so as to be converted into an analog image signal, and then be supplied to an image display section 150. According to the present embodiment, there is provided an image display memory 151 so that a new image signal is supplied to the image display section 150 at predetermined intervals. The image display memory 151 can store at least two frames of through image signals to perform first-in first-out for through image signals, so that switching timing of the through images can be suitably controlled.

According to the present embodiment, the system control circuit 110 performs the white balance regulation, the γ correction, the photometry, and the focusing, as mentioned above. The image processing circuit 140 separates image signals of RGB into R, G, and B signals. The thus separated R, G, and B signals are led to the system control circuit 110. The system control circuit 110 performs the white balance regulation, the γ correction, and the conversion into YC signals, for the R, G, and B signals, and then the YC signals are led to the image display memory 151. On the other hand, the photometry and the focusing are performed based on Y signal of the YC signals, so that there are performed an aperture control of the aperture 1041 and a displacement control of the focus lens of the image taking lens 1021 to the in-focus point.

Next, there will be explained details of operation of individual sections as well as a flow of the through image signals.

An image signal, which represents the subject image formed on the light receiving plane of the CCD solid state imaging device 120 through the image taking lens 1021, is fed in form of the through image signal to the A/D conversion circuit 130 in response to the timing signal from the timing generation circuit 121 at prescribed intervals (for instance, each 33 ms). The A/D conversion circuit 130 converts an analog image signal to a digital image signal to generate the through image signal. The through image signal is supplied to the image processing circuit 140 under the control of the memory control section 111a. The image processing circuit 140 separates image signals of RGB into R, G, and B signals. The thus separated R, G, and B signals are supplied to the system control circuit 110 and a color temperature detection circuit 141. The color temperature detection circuit 141 detects individual color temperatures, and sets a gain according to the color temperature to individual color amplifiers of a white balance regulation section of the system control circuit 110.

R, G, and B signals are supplied to the system control circuit 110 so that the white balance regulation section regulates ratio of amplifications of individual color signals. As a result, the white balance is regulated, and the individual color signals of R, G, and B, which are subjected to the γ correction, are converted into the YC signals by a color conversion matrix. The YC signals are led to and stored in the image display memory 151 under the control of the memory control section 111a. As mentioned above, the image display memory 151 stores at least two frames of image signals. Of the two frames of image signals, a frame of image signals, which is stored in earlier time, is led to a is led to the D/A conversion circuit 160 so as to be converted into an analog image signal, and then be supplied to an image display section 150 so as to display the through image on the display screen.

The system control circuit 110 instructs the focusing control means 1030 in accordance with a focusing result of the TTL focusing section of the system control circuit 110 to move a focus lens of the image taking lens 1021 to an in-focus point. When a zoom switch (not illustrated) is operated, the system control circuit 110 instructs the zoom control means 1020 in accordance with operation of the zoom switch to move a zoom lens of image taking lens 1021 to a position according to the zooming magnification by the operation of the zoom switch.

Thus, an image taking processing starts when the release button 104 is depressed where the through image of the zooming magnification according to the operational position of the zoom switch, which is always focused, is displayed.

The system control circuit 110 causes the timing generation circuit 121 to supply an exposure start signal to the CCD solid state imaging device 120 in timing when the release button 104 is depressed. At that time, when the system control circuit 110 decides the necessity for a luminescence of the image taking auxiliary light in accordance with the photometry result, the system control circuit 110 instructs the emission amount control means 112 to cause two or more LED's 114 to emit the image taking auxiliary light in synchronism with depression of the release button 104.

Thus, after a photography is carried out in such a way that no image taking auxiliary light is emitted when brightness of field is light, and image taking auxiliary light is emitted when brightness of field is dark, the system control circuit 110 instructs the timing generation circuit 121 to supply an exposure termination signal to the CCD solid state imaging device 120 after a predetermined shutter time elapses, and causes the CCD solid state imaging device 120 to output an image signal to the A/D conversion circuit 130 in synchronism with the exposure termination signal. The A/D conversion circuit 130 converts the analog image signal generated from the CCD solid state imaging device 120 to the digital image signal. The digital image signal is supplied via the bus to a memory 180 under the control of the memory control section 111*a*. When the memory 180 completely stores all the image signals consisting of all the pixels of the CCD solid state imaging device 120, the system control circuit 110 performs the white balance regulation and the γ correction for the image signals read out under the control of the system control circuit 110. After the image signals, which are subjected to the white balance regulation and the γ correction, are converted into YC signals in the system control circuit 110, a frame of YC signals is supplied via the bus to a compression/expansion circuit 190 under the control of the memory control section 111*a*, so that the image signal consisting of the YC signals is compressed. The compressed image signals are stored in the storage medium 200 such as a memory card.

Incidentally, the digital camera 1 has communication means 116 for performing a radio communication with the exterior when an antenna 1101 is connected with a connector 1105 in the camera body side part through a cable, a display unit 115 for displaying the operation contents for a user, and a memory 10B.

Figure 3:
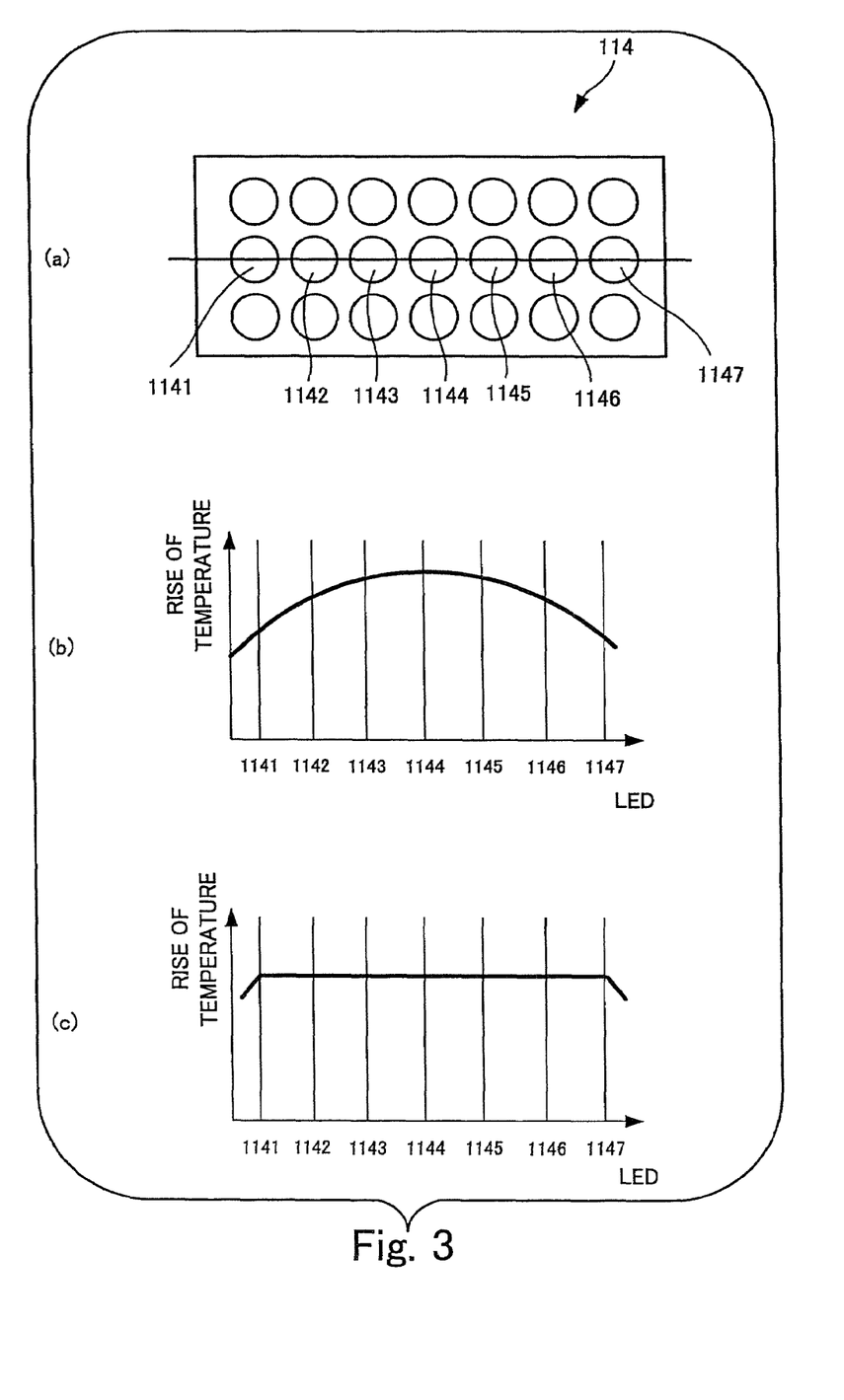
FIG. 3 is an explanatory view useful for understanding effects of the present invention.

FIG. 3 is an explanatory view useful for understanding effects of the present invention.

A part (a) of FIG. 3 shows an arrangement of 21 pieces of LED 114 as an example of an arrangement of a plurality of LED's 114. A part (b) of FIG. 3 shows a state of the temperature rise of 7 pieces of LED 1141 to LED 1147 of the center where the same amount of current conducts through all LED's 114 shown in the part (a) of FIG. 3 as in the conventional one, so that light is emitted. A part (c) of FIG. 3 shows a state of the temperature rise of 7 pieces of LED 1141 to LED 1147 of the center where the present invention is applied.

When the same amount of driving current conducts through all the LED 1141 to LED 1147 wherein 21 pieces of LED 114 are arranged in such a manner that 7 pieces of LED 114 are arranged in the horizontal direction and 3 pieces of LED 114 are arranged in the vertical direction, as shown in the part (a) of FIG. 3, the temperature rise of the LED of the center is emphasized, as shown in the part (b) of FIG. 3.

In view of the foregoing, according to the present invention, when the LED driving circuit 113 shown in FIG. 2 causes a plurality of LED's 114, which is arranged on a two-dimensional basis as shown in the part (a) of FIG. 3, to emit light, the light emission of the LED 114 is performed in such a way that a relatively small current is supplied to LED 1142 to LED 1146 arranged on the center portion, of the plurality of LED's 114, and a relatively large current is supplied to LED's (excepting LED 1142 to LED 1146) arranged on the peripheral portion, of the plurality of LED's 114.

In the prior art, as shown in the part (b) of FIG. 3, the temperature rise of LED 1142 to LED 1146 of the central portion is large, and thus LED 1142 to LED 1146 of the central portion became tired and it finally broke occasionally. To the contrary, according to the present invention, as shown in the part (c) of FIG. 3, the temperature rise of LED's is equalized. This contributes to an equalization of life time of a plurality of LED's 114.

Thus, when life time of LED 1142 to LED 1146 of the central portion is postponed, and the longevity of all peripheral LED 114 excluding LED in the central portion is equalized, it is possible to exchange all LED at a time. Thus, it becomes easy to maintain. A postpone of life time of the LED of the central portion contributes to a reduction of the running cost.

According to the present embodiment, there is disclosed an equalization of life time a plurality of LED's in a still picture photography involving the image taking auxiliary light. However, it is possible to contribute to an equalization of temperature rise of LED's by controlling a magnitude of the driving current to be supplied to LED's of the central portion and LED's of the peripheral portion in accordance with an image taking time for a dynamic picture photography or a number of times of photography for a multi-page photography. It is possible to emit light by conducting the current of the duty ratio even if LED's 114 not keeping always conducting an electric current.

Figure 4:
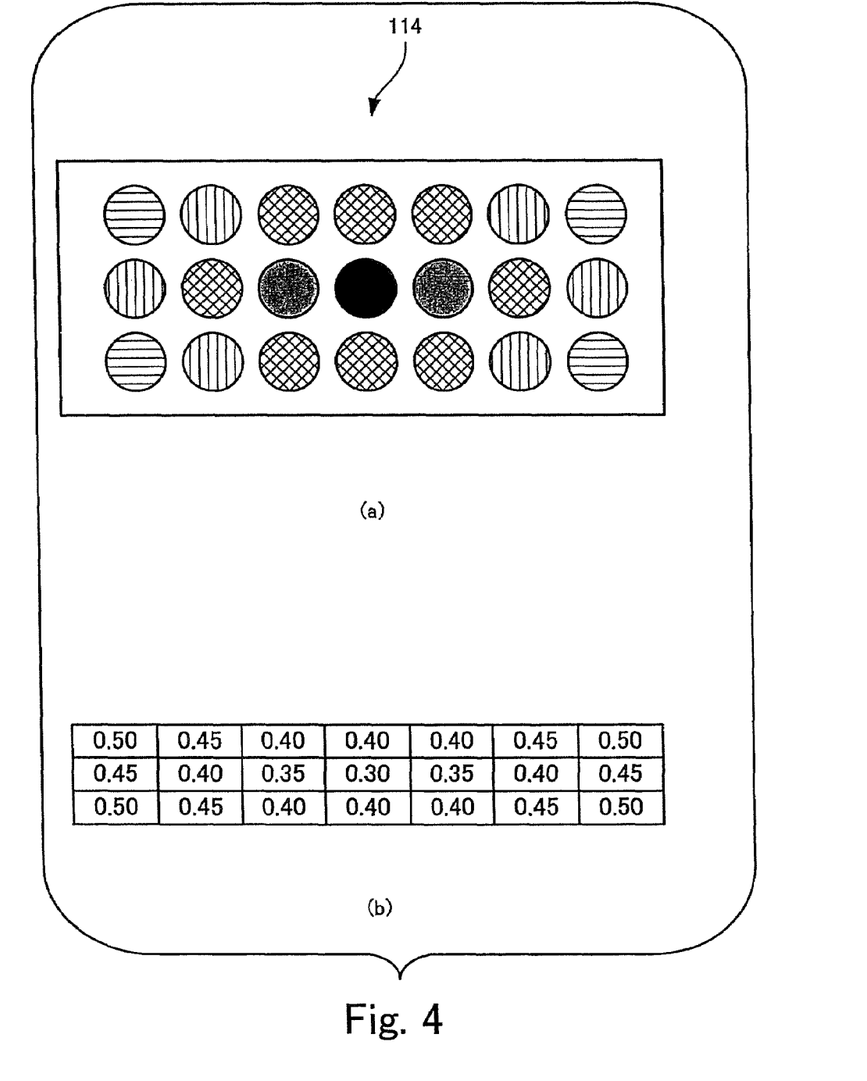
FIG. 4 is an explanatory view useful for understanding the second embodiment of the present invention.
Figure 5:
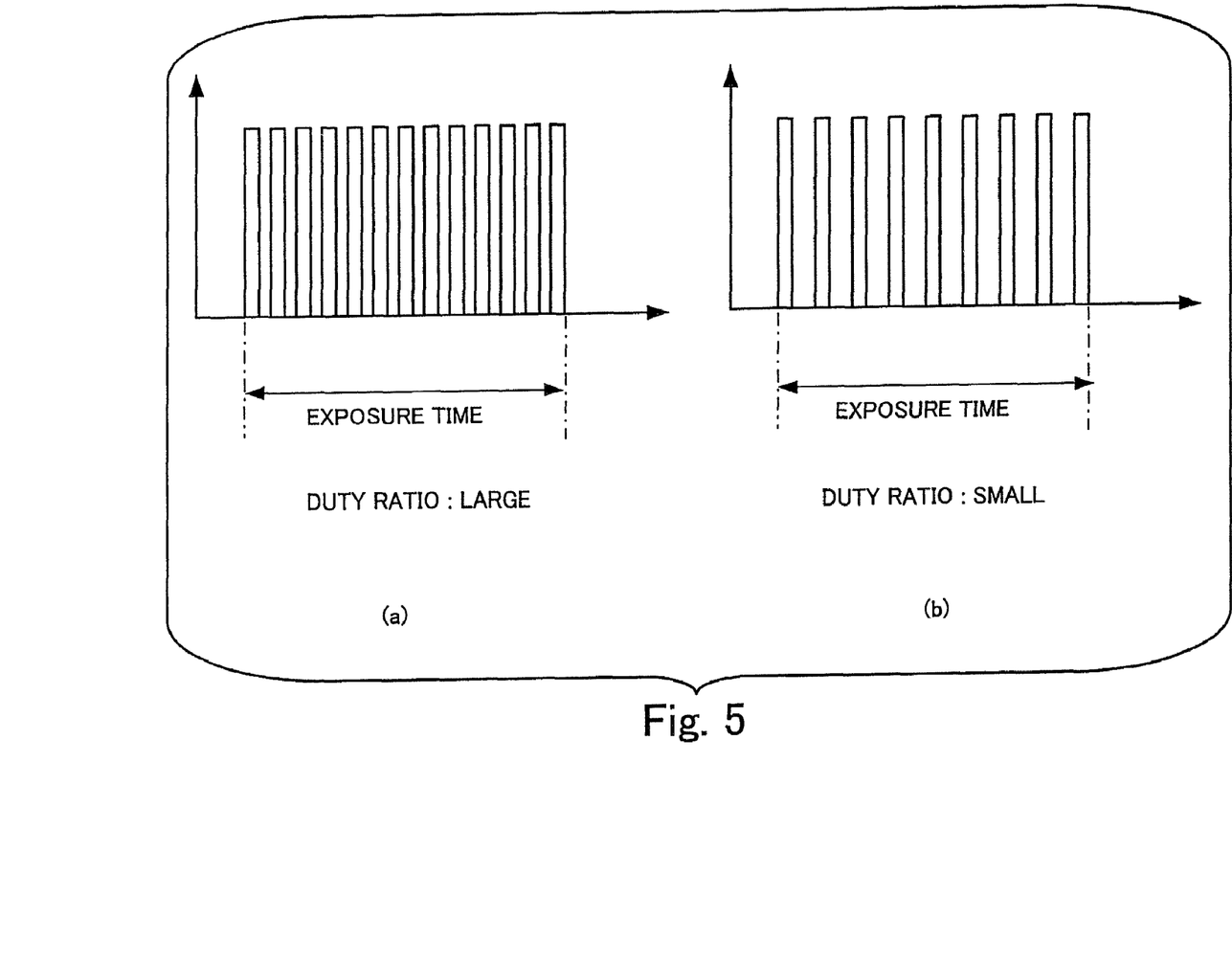
FIG. 5 is an explanatory view useful for understanding the second embodiment of the present invention.

FIG. 4 is an explanatory view useful for understanding the second embodiment of the present invention. FIG. 5 is an explanatory view useful for understanding the second embodiment of the present invention.

A part (a) of FIG. 4 shows an arrangement of LED 114 in a similar fashion to that of the first embodiment. A part (b) of FIG. 4 shows duty ratio of the current to be applied to 21 pieces of LED's 114 shown in the part (a) of FIG. 4.

FIG. 5 shows how the current varies in accordance with a variation of the duty ratio.

As seen from a part (a) of FIG. 5, when a relatively large duty ratio of current conducts, it becomes a large current. As seen from a part (b) of FIG. 5, when a relatively small duty ratio of current conducts, it becomes a small current. Thus, the use of a duty ratio of current also makes it possible to obtain the same effect as the first embodiment.

Figure 6:
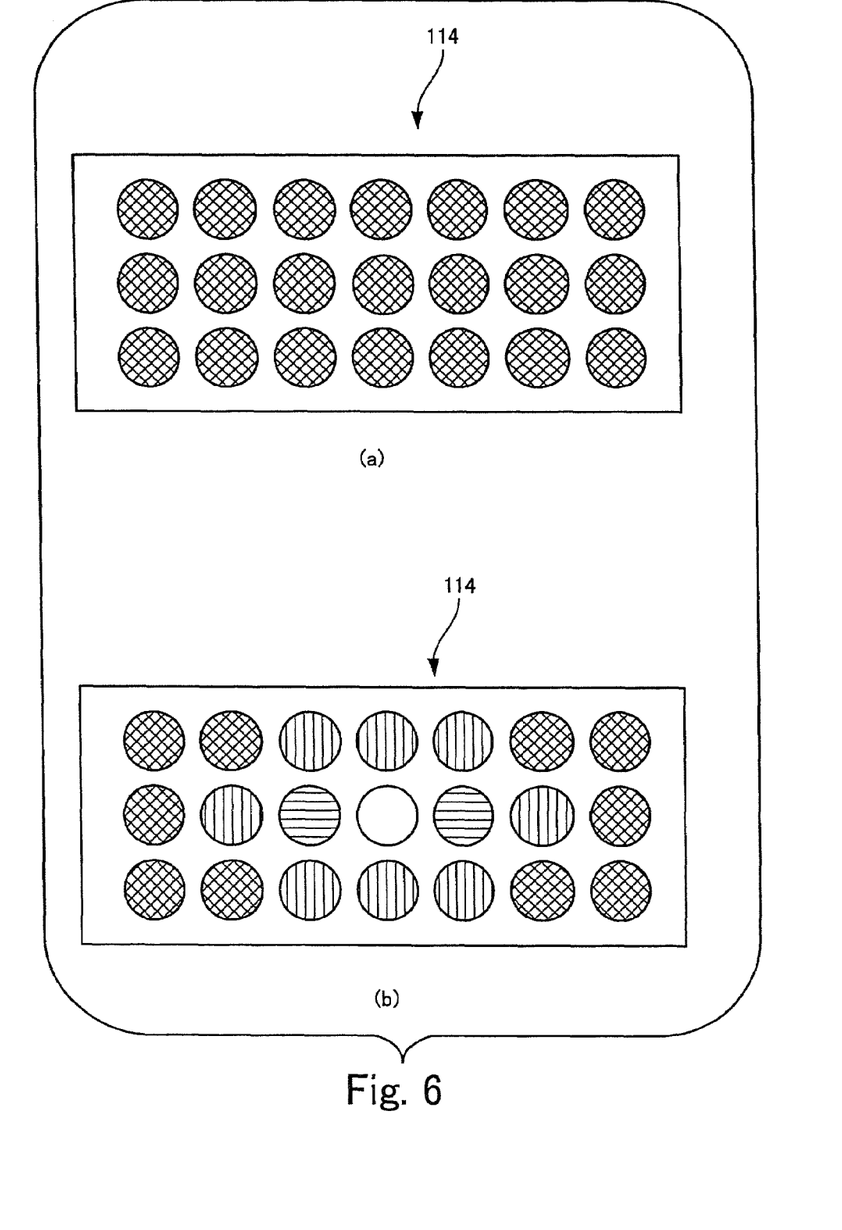
FIG. 6 is an explanatory view useful for understanding the third embodiment of the present invention.
Figure 7:
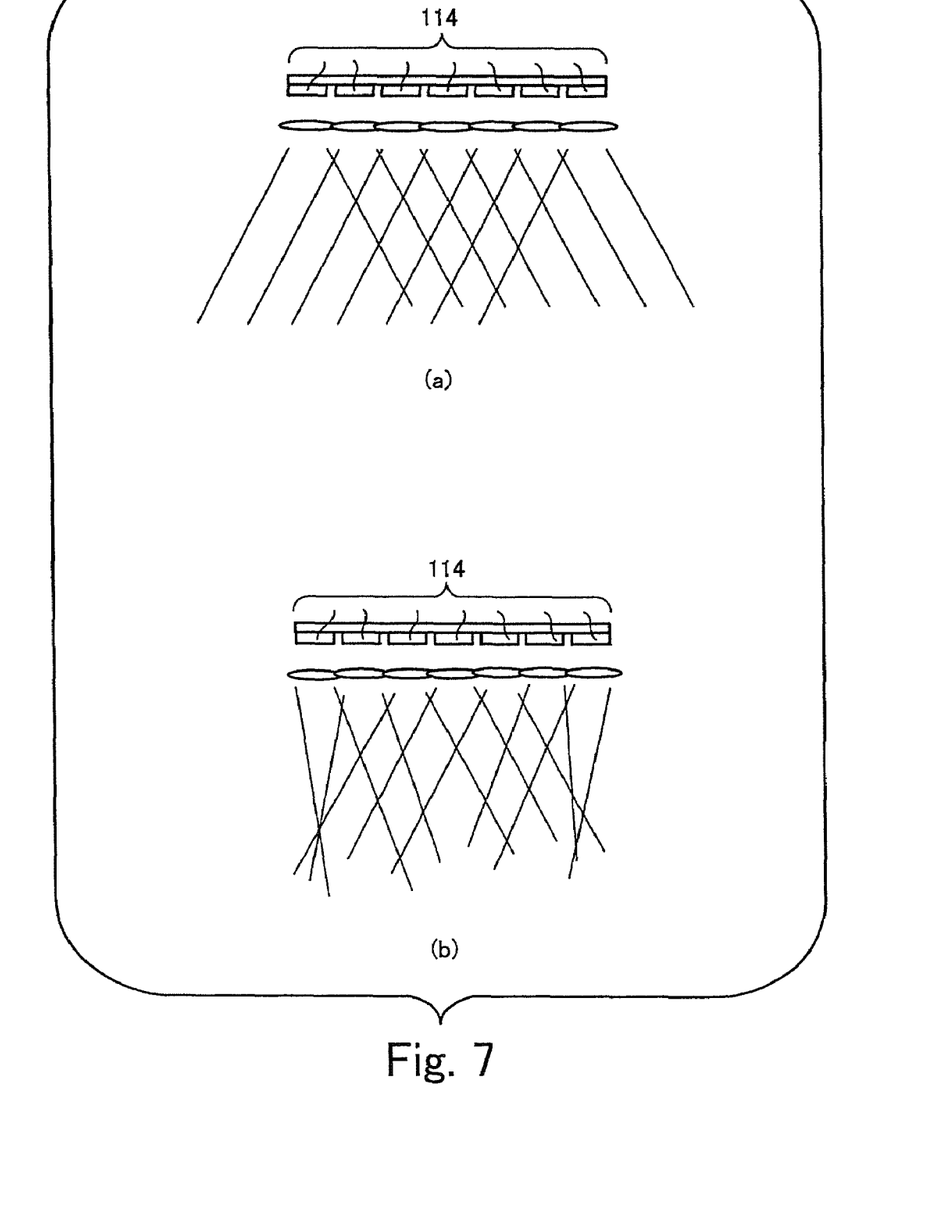
FIG. 7 is an explanatory view useful for understanding the third embodiment of the present invention.

FIG. 6 is an explanatory view useful for understanding the third embodiment of the present invention. FIG. 7 is an explanatory view useful for understanding the third embodiment of the present invention.

According to the first embodiment and the second embodiment, it is intended to contribute to an equalization of fatigue of LED's of the central portion and LED's of the peripheral portion by conducting the relatively small current through LED's of the central portion. However, it is possible to contribute to an equalization of life time or fatigue of all LED's in such a way that when an image taking auxiliary light is emitted, all LED's are fully emitted, and LED's of the periphery, which are less in fatigue, are used for other use, for instance, when the AF auxiliary light is emitted, so that use frequency is enhanced.

A part (a) of FIG. 6 shows a luminescent state wherein when an image taking auxiliary light is emitted, the same amount of current is supplied to the plurality of LED's 114 to emit light. A part (b) of FIG. 6 shows a luminescent state wherein when an AF auxiliary light is emitted, the main amount of current is supplied to LED's arranged on the peripheral portion, of the plurality of LED's 114, so that the LED's arranged on the peripheral portion emit light with the main light quantity. The place in which it is shown in figure by a no sign shows that it is not because of the rise in heat. The rise in heat grows in the order of hatching in the horizontal direction, hatching in the vertical direction, and hatching intersected in the place.

In this manner, frequency in use of LED's on the periphery is enhanced in such a way that the full-light emission is performed at the time of emission of the image taking auxiliary light, and the LED's arranged on the peripheral portion emit light with the main light quantity at the time of emission of the AF auxiliary light. This feature also makes it possible to obtain the same effect.

Hereinafter, there will be explained how the luminescence distribution of the entire two or more LED's is established to achieve a more remarkable effect when two or more LED's are used for both the time when only the image taking auxiliary light is emitted from LED and the time when the AF auxiliary light is emitted.

FIG. 7 shows the luminescence distribution of the entire two or more LED's 114.

On the subject side of the individual LED 114 of FIG. 7, there is provided a lens for adjusting luminescence distribution of the LED 114.

If two or more LED's 114 are used only for emission of the image taking auxiliary light, as shown in a part (a) of FIG. 7, it is acceptable that the two or more LED's 114 are ones which project the auxiliary light to the whole area in angle of field.

However, if the LED's 114 are used for emission of not only the image taking auxiliary light but also the AF auxiliary light, as shown in a part (b) of FIG. 7, it is better that LED's, which are arranged on the center portion, of the two or more LED's 114, are ones which emit light to the whole area in angle of field, and LED's, which are arranged on the peripheral portion, of the two or more LED's 114, are ones which emit light to the central portion in angle of field.

Thus, at the time of emission of the image taking auxiliary light, it is possible to project the image taking auxiliary light with the main light quantity to the main subject. And in addition, at the time of emission of the AF auxiliary light, it is possible to project the AF auxiliary light to the central portion wherein probability where the main subject exists is the highest.

FIG. 8 to FIG. 11 is an explanatory view useful for understanding the fourth embodiment of the present invention.

According to the first embodiment to the third embodiment of the present invention as mentioned above, in order to contribute to an equalization of the life time of the LED's 114, a magnitude of current to drive LED's of the central portion is set to be smaller than that of LED's of the peripheral portion, or frequency in use of LED's on the periphery is enhanced. On the other hand, it is possible to contribute to an equalization of the life time of the LED's 114 in such a way that a temperature sensor is used to detect LED's which are intense in the rise of the temperature and a relatively small current conducts through the LED's in accordance with the temperature of the detected LED's, or reversely a relatively large current conducts through LED's which are little in the rise of the temperature.

Figure 8:
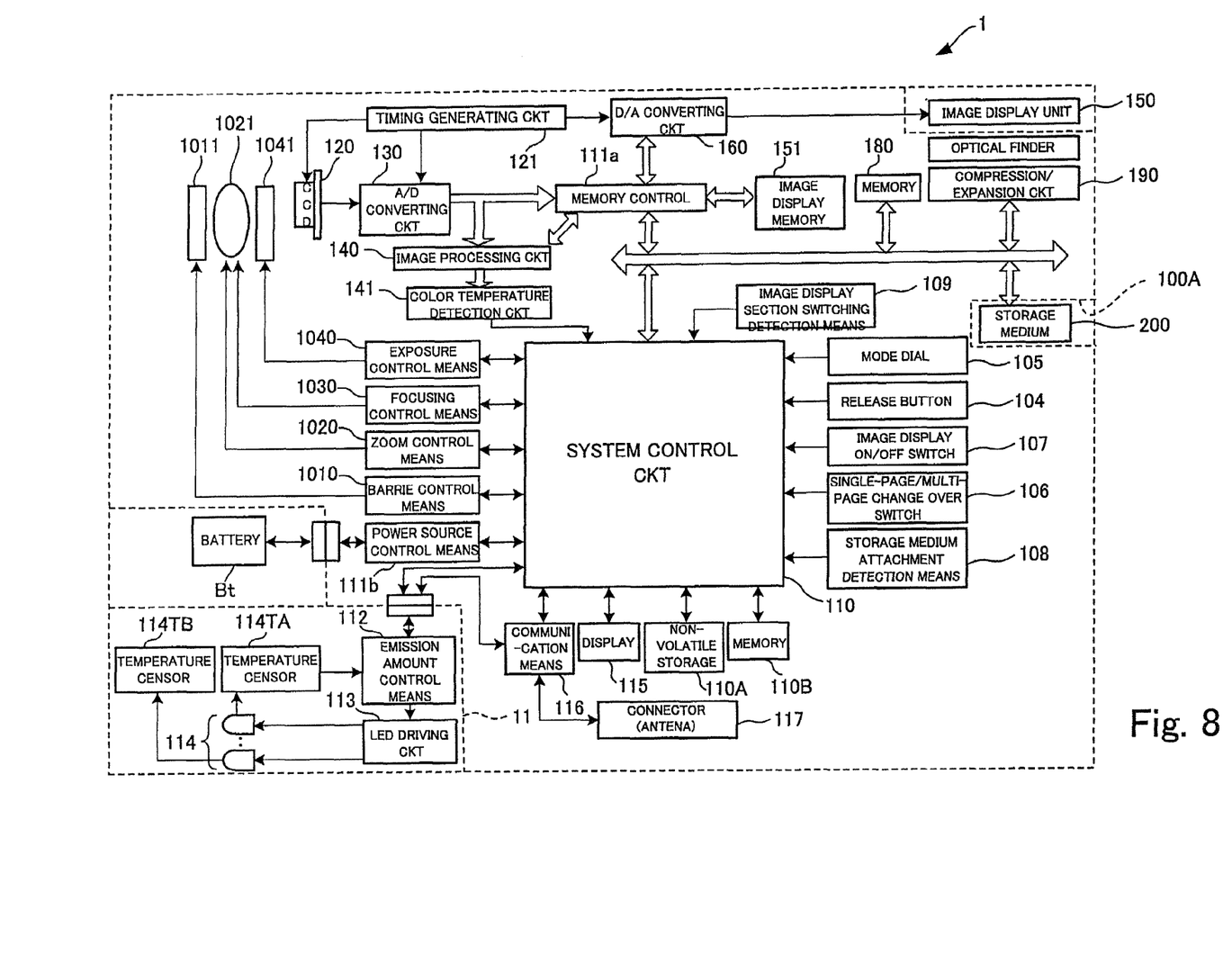
FIG. 8 is an explanatory view useful for understanding the fourth embodiment of the present invention.
Figure 9:
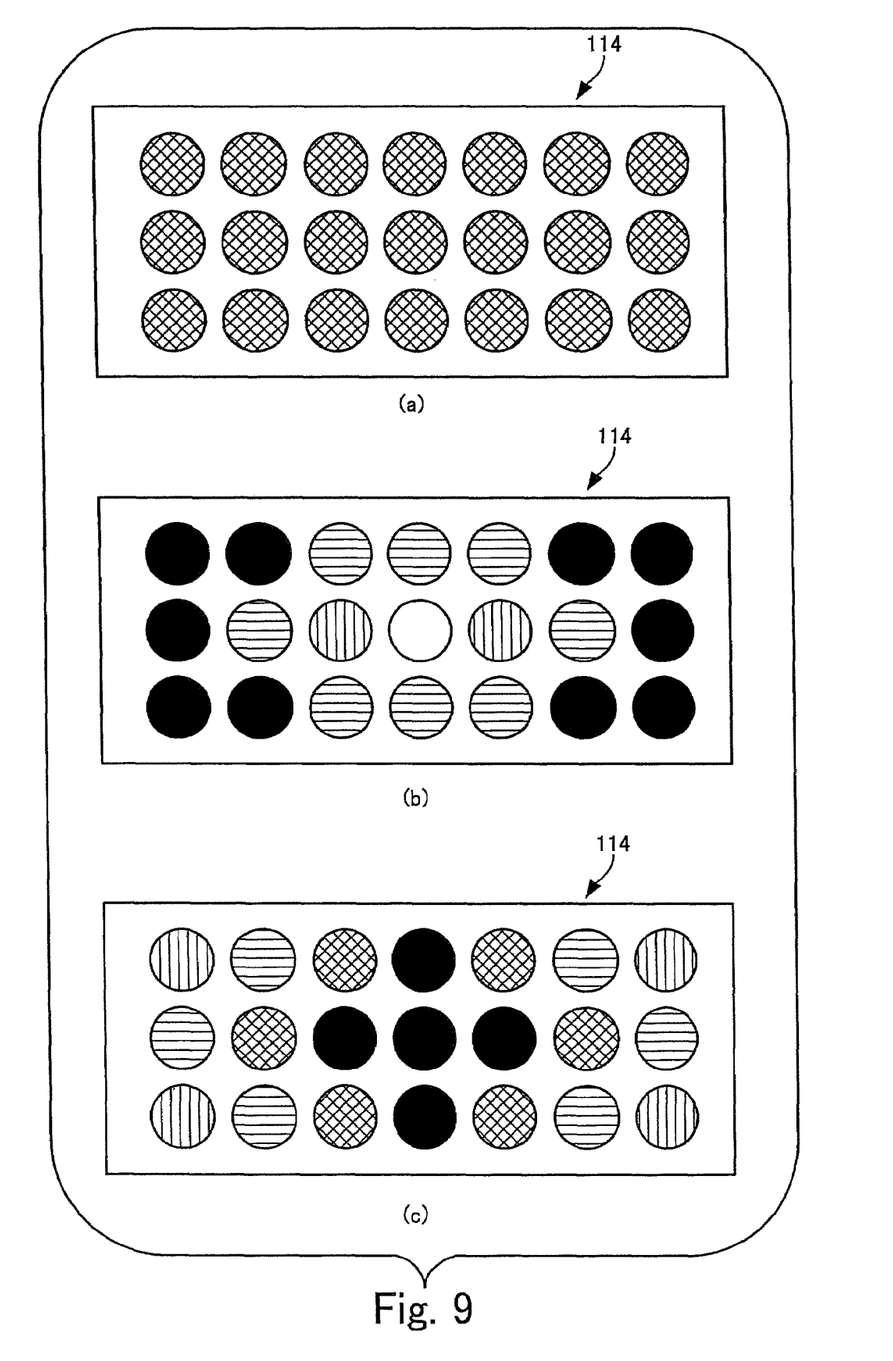
FIG. 9 is an explanatory view useful for understanding the fourth embodiment of the present invention.

FIG. 8 shows the structure of the digital camera 1, which is the same as that of FIG. 2, excepting that temperature sensors 114TA and 114TB are added. FIG. 9 shows a distribution of the temperature of two or more LED's 114 to determine a disposition of two temperature sensors 114TA and 114TB. It is the large and thicker the rise in heat is the color painted out, the larger in the circle that shows each LED in the figure being painted out is the rise in heat.

Figure 10:
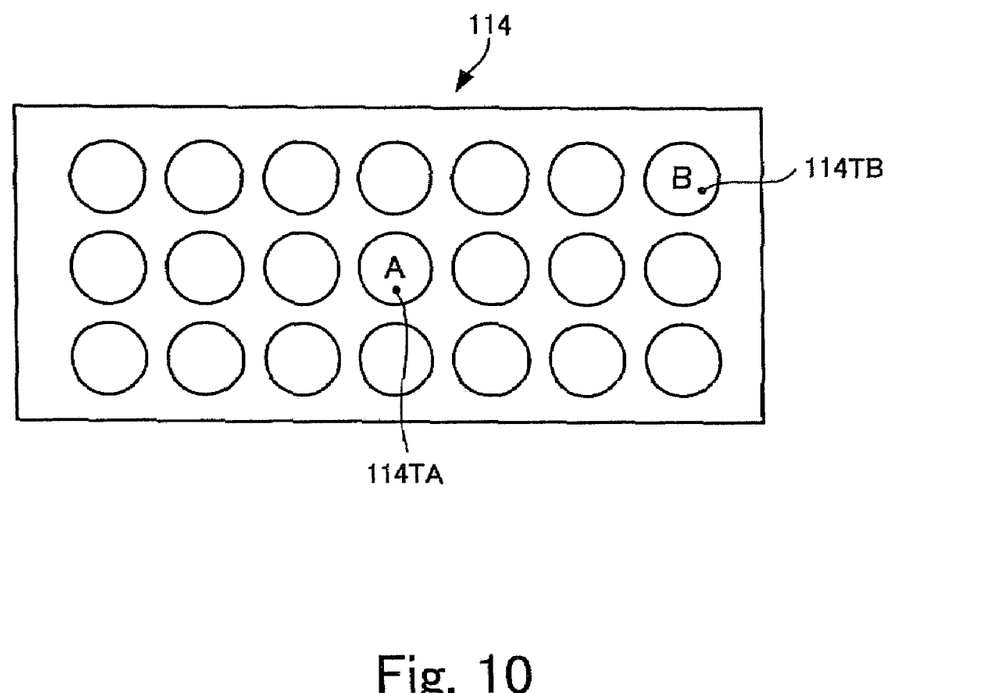
FIG. 10 is an explanatory view useful for understanding the fourth embodiment of the present invention.
Figure 11:
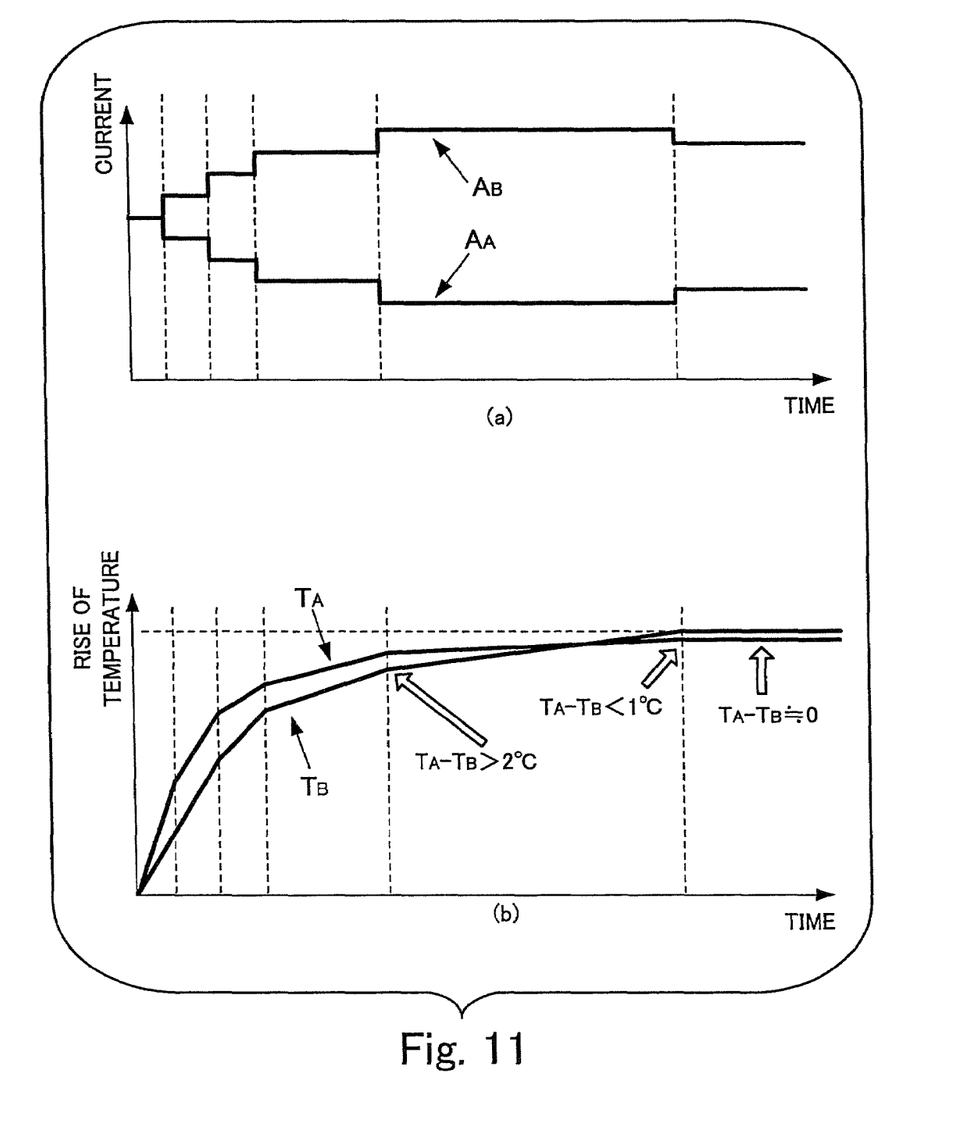
FIG. 11 is an explanatory view useful for understanding the fourth embodiment of the present invention.

FIG. 10 shows the disposition of two temperature sensors 114TA and 114TB, which is determined in view of the distribution of the temperature shown in FIG. 9. A part (a) of FIG. 11 shows variations of a driving current AA that conducts through LED's (LED A and LED's arranged in the lateral direction with respect to LED A) and a current AB that conducts through LED's (LED's other than the LED's of the central portion, including LED B) of the periphery in accordance with the detection states of the temperature of two temperature sensors 114TA and 114TB. A part (b) of FIG. 11 shows a state that a temperature difference between LED A of the central portion and LED B is equalized by driving of the part (a) of FIG. 11.

As shown in the part (a) of FIG. 9, though it is desirable that the equalization of the rise in heat of all LED's 114 is achieved, it offers temperature distribution shown in the part (b) of FIG. 9, because LED in the central portion is not radiated well. When frequency in luminescence of the AF auxiliary light is enhanced, it is expected that it offers temperature distribution shown in the part (c) of FIG. 9.

Thus, there is provided a structure in which two temperature sensors 114TA and 114TB are provided at the places of the central portion and the peripheral portion, respectively, as shown in FIG. 10, and the driving currents AA and AB of LED's of the central portion and the peripheral portion are varied in accordance with the temperature difference between the central portion and the peripheral portion.

Here, as shown in the part (a) of FIG. 11 and part (b) of FIG. 11, the driving currents AA and AB are controlled so as to establish relations set forth below.

AA/1.1, AB×1.1 at TB−TA>2° C.

AA×1.05, AB/1.05 at TB−TA<−1° C.

Thus, the temperature sensors 114TA and 114TB detect the rise in temperature of the LED A of the central portion and the rise in temperature of the LED B of the peripheral portion, as shown in the part (b) of FIG. 11, respectively, and a magnitude of both the driving currents of the LED A of the central portion and the LED B of the peripheral portion is controlled in accordance with the individual detected temperature. Thus, it is possible to contribute to equalization of rise in temperature of the peripheral portion of both the LED's.

Figure 12:
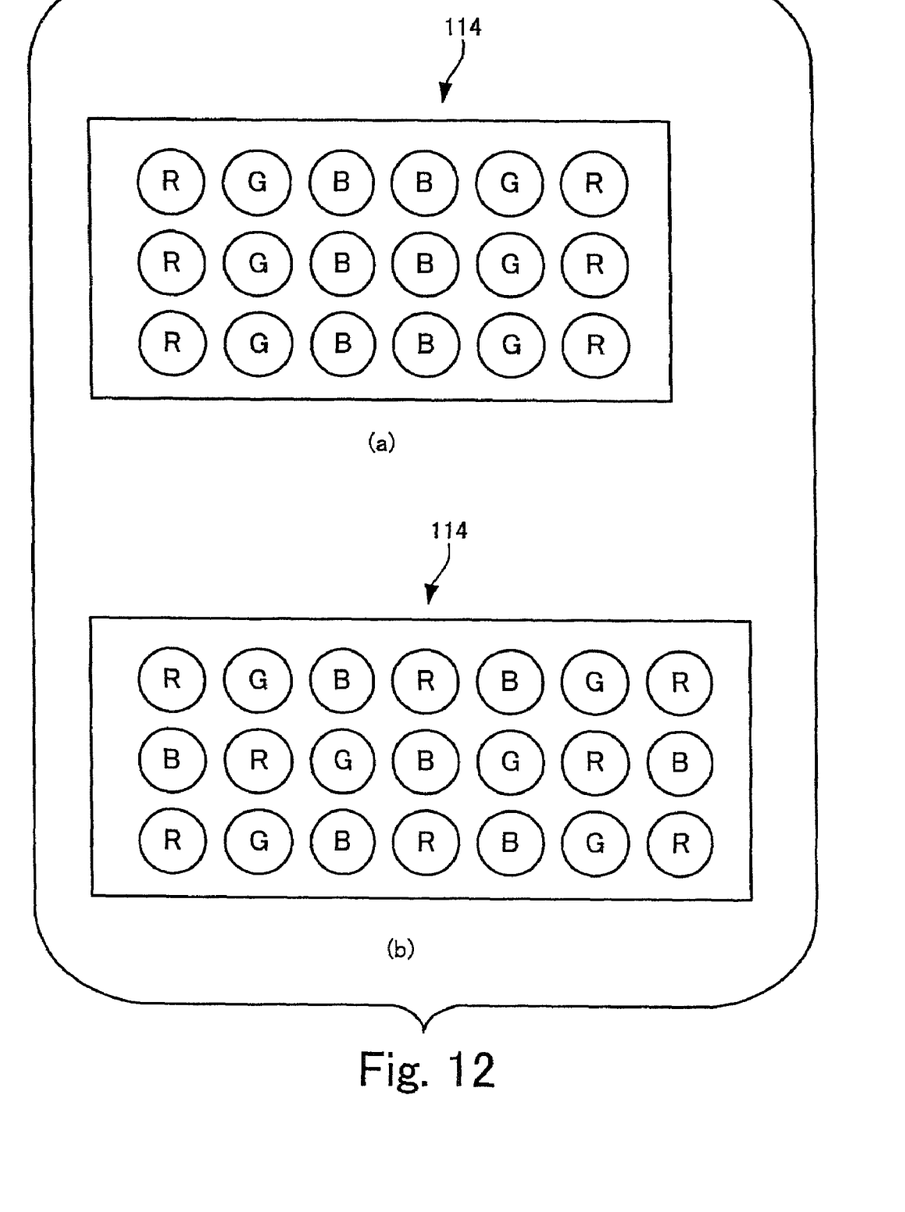
FIG. 12 is an explanatory view useful for understanding the fifth embodiment of the present invention.

FIG. 12 is an explanatory view useful for understanding the fifth embodiment of the present invention.

FIG. 12 shows an arrangement wherein three sorts of LED's of red (R), blue (B), and green (G), as LED's which emit mutually different lights, are arranged in accordance with efficiency of light emission.

A part (a) of FIG. 12 shows exemplarily an arrangement wherein LED's, which emit blue light (B) that is relatively high in efficiency of light emission, are arranged at the central portion, LED's, which emit green light (G) that is relatively low in efficiency of light emission, are arranged at the periphery of the central portion, and LED's, which emit red light (R) that is worst in efficiency of light emission, are arranged at the outline portion.

Those arrangements make it possible to suppress the rise of temperature of the LED of the central portion because of difference of the efficiency of light emission, even if the same current conduct.

Moreover, in case of the arrangement of the part (a) of FIG. 12, there is a possibility of an occurrence of lack of uniformity in color when the image taking auxiliary light is emitted. Accordingly, as shown in the part (b) of FIG. 12, there is provided an arrangement in which the efficient one and the bad one are arranged mixing it. This feature makes it possible to surely improve lack of uniformity in color, though the effect falls a little in the rise in heat as compared with the composition of the part (a) of FIG. 12. An arrangement of the part (b) of FIG. 12 also makes it possible to obtain the same effect as that of the arrangement of the part (a) of FIG. 12 by means of control of the driving current as explained in conjunction with the first embodiment to the third embodiment.

As mentioned above, according to the present invention, it is possible to provide an image taking apparatus capable of contributing to equalization of the life of individual one of two or more LED's arranged on a two-dimensional basis, of the light-emitting section, and a method of light emission of the light-emitting section of the image taking apparatus.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image taking apparatus that forms an image of a subject on an imaging device to create image data representative of the subject, the image taking apparatus comprising:
a light-emitting section in which two or more LED's are arranged on a two-dimensional basis, the light-emitting section emitting light to the subject; and
a driving section that supplies current to the two or more LED's for luminescence,
wherein the driving section causes the two or more LED's to perform light emission in such a way that a relatively small current is supplied to an LED arranged on a center portion, of the two or more LED's, and a relatively large current is supplied to an LED arranged on a peripheral portion, of the two or more LED's, wherein the driving section causes the two or more LED's to perform light emission in such a way that a relatively short time width of pulse current is supplied to an LED arranged on a center portion, of the two or more LED's, so that a relatively small current on a time-means basis is supplied, and a relatively long time width of pulse current is supplied to an LED arranged on a peripheral portion, of the two or more LED's, so that a relatively large current on a time-means basis is supplied, and in addition pulse currents are alternatively supplied to an LED arranged on a center portion and an LED arranged on a peripheral portion, of the two or more LED's.

2. An image taking apparatus that forms an image of a subject on an imaging device to create image data representative of the subject, the image taking apparatus comprising:
a light-emitting section in which two or more LED's are arranged on a two-dimensional basis, the light-emitting section emitting light to the subject; and
a driving section that supplies current to the two or more LED's for luminescence,
wherein the driving section supplies a relatively smaller current to an LED in which the temperature rises more intensively than the rest of the two or more LED's, in accordance with the temperature rise of the two or more LED's.

3. An image taking apparatus that forms an image of a subject on an imaging device to create image data representative of the subject, the image taking apparatus comprising:
a light-emitting section in which two or more LED's are arranged on a two-dimensional basis, the light-emitting section emitting light to the subject; and
a driving section that supplies current to the two or more LED's for luminescence,
wherein the light-emitting section emits an image taking auxiliary light to a subject at the time of image taking, and emits AF auxiliary light to the subject at the time of focus control, and
wherein the light-emitting section emits the image taking auxiliary light in such a way that a current is supplied to the two or more LED's for luminescence, and emits the AF auxiliary light in such a way that a main amount of current is supplied to at least one LED arranged on a peripheral portion, of the two or more LED's, so that the at least one LED arranged on the peripheral portion emits light with a main light quantity.

4. The image taking apparatus according to claim 3, wherein all the two or more LED's emit light to the whole area in angle of field.

5. The image taking apparatus according to claim 3, wherein an LED arranged on a center portion, of the two or more LED's, emits light to the whole area in angle of field, and the LED arranged on a peripheral portion, of the two or more LED's, emits light to a central portion in angle of field.

6. An image taking apparatus that forms an image of a subject on an imaging device to create image data representative of the subject, the image taking apparatus comprising:
a light-emitting section in which two or more LED's are arranged on a two-dimensional basis, the light-emitting section emitting light to the subject; and
a driving section that supplies current to the two or more LED's for luminescence,
wherein the light-emitting section comprises two or more sorts of LED's which emit mutually different light, in which an LED that is relatively high in efficiency of light emission is arranged at a central portion, and an LED that is relatively low in efficiency of light emission is arranged at a peripheral portion, wherein the two or more sorts of LED's are three sorts of LED's emitting red light, blue light, and green light, and wherein the LED emitting blue light is mainly arranged at the central portion, the LED emitting red light is mainly arranged at the peripheral portion, and the LED emitting green light is arranged between the central portion and the peripheral portion.

7. An image taking apparatus that forms an image of a subject on an imaging device to create image data representative of the subject, the image taking apparatus comprising:
a light-emitting section in which two or more LED's are arranged on a two-dimensional basis, the light-emitting section emitting light to the subject; and
a driving section that supplies current to the two or more LED's for luminescence,
wherein the light-emitting section comprises two or more sorts of LED's which emit mutually different light, in which an LED that is relatively high in efficiency of light emission is arranged at a central portion, and an LED that is relatively low in efficiency of light emission is arranged at a peripheral portion, wherein the two or more sorts of LED's are three sorts of LED's emitting red light, blue light, and green light, and wherein the LED emitting red light, the LED emitting blue light, and the LED emitting green light are arranged on an intermixing basis in such a way that a lot of the LED's emitting red light is located at the peripheral portion, and the LED emitting blue light is located at the central portion.

8. A method of light emission of a light-emitting section in which two or more LED's are arranged on a two-dimensional basis, the light-emitting section emitting light to the subject, the light-emitting section being provided in an image taking apparatus that forms an image of a subject on an imaging device to create image data representative of the subject,
wherein the light-emitting section emits an image taking auxiliary light to a subject at the time of image taking, and emits AF auxiliary light to the subject at the time of focus control, and
wherein the light-emitting section emits the image taking auxiliary light in such a way that a current is supplied to the two or more LED's for luminescence, and emits the AF auxiliary light in such a way that a main amount of current is supplied to at least one LED arranged on a peripheral portion, of the two or more LED's, so that the at least one LED arranged on the peripheral portion emits light with a main light quantity.

* * * * *